United States Patent
Szilagyi

(10) Patent No.: US 10,069,766 B2
(45) Date of Patent: Sep. 4, 2018

(54) ACCELERATED DATA TRANSFER USING THREAD POOL FOR PARALLEL OPERATIONS

(71) Applicant: TransferSoft, Inc., Culver City, CA (US)

(72) Inventor: Attila Mark Szilagyi, San Pedro, CA (US)

(73) Assignee: TRANSFERSOFT, INC., Culver City, CA (US)

( * ) Notice: Subject to any disclaimer, the term of this patent is extended or adjusted under 35 U.S.C. 154(b) by 393 days.

(21) Appl. No.: 14/793,608

(22) Filed: Jul. 7, 2015

(65) Prior Publication Data

US 2017/0012906 A1    Jan. 12, 2017

(51) Int. Cl.
| | | |
|---|---|---|
| *H04B 1/04* | (2006.01) | |
| *H04L 12/861* | (2013.01) | |
| *H04L 12/805* | (2013.01) | |
| *H04L 12/801* | (2013.01) | |

(52) U.S. Cl.
CPC ....... *H04L 49/9005* (2013.01); *H04B 1/0483* (2013.01); *H04L 47/193* (2013.01); *H04L 47/365* (2013.01); *H04L 49/9057* (2013.01)

(58) Field of Classification Search
CPC ... H04B 1/0483; H04L 47/193; H04L 47/365; H04L 49/9005; H04L 49/9057
USPC ................................ 370/208, 230, 231, 335
See application file for complete search history.

(56) References Cited

U.S. PATENT DOCUMENTS

| | | | |
|---|---|---|---|
| 6,311,225 B1 | 10/2001 | Harris et al. | |
| 6,389,473 B1 * | 5/2002 | Carmel | H04L 29/06 709/231 |
| 8,204,085 B1 * | 6/2012 | Courtney | H04J 3/0623 370/395.51 |
| 8,503,546 B1 * | 8/2013 | Ashrafi | H04L 27/362 370/208 |
| 8,838,817 B1 | 9/2014 | Biswas | |
| 2002/0031088 A1 * | 3/2002 | Packer | H04L 1/0002 370/231 |

(Continued)

FOREIGN PATENT DOCUMENTS

| | | |
|---|---|---|
| WO | 1998012630 A1 | 3/1998 |
| WO | 2015079246 A1 | 6/2015 |

OTHER PUBLICATIONS

International Search Report and Written Opinion dated Oct. 27, 2016 regarding PCT/US2016/041301.

*Primary Examiner* — Melvin Marcelo
*Assistant Examiner* — Natali N Pascual Peguero
(74) *Attorney, Agent, or Firm* — Arent Fox LLP

(57) ABSTRACT

A method, an apparatus, and a computer program product for accelerating network data transfer are provided. In one aspect, a plurality of data streams are received at a local host, combined into a single stream and divided into fragments including one or more segments. The fragments are each stored in buffers and processed in parallel by a plurality of worker threads. Each fragment is encoded and packetized into a data packet. The data packets are transmitted over a network to a remote host as a plurality of parallel data streams over at least one data link. As buffer locations become available, additional fragments are stored in the buffer and processed on a substantially ongoing basis for transmission over the network.

56 Claims, 10 Drawing Sheets

(56) References Cited

U.S. PATENT DOCUMENTS

| | | | | |
|---|---|---|---|---|
| 2003/0200284 | A1* | 10/2003 | Philbrick | H04L 69/16 |
| | | | | 709/219 |
| 2004/0066765 | A1* | 4/2004 | Segal | G06F 13/1663 |
| | | | | 370/335 |
| 2005/0240930 | A1* | 10/2005 | Amamiya | G06F 9/3012 |
| | | | | 718/100 |
| 2006/0171414 | A1* | 8/2006 | Katibian | H04L 47/10 |
| | | | | 370/468 |
| 2008/0144504 | A1 | 6/2008 | Marcondes | |
| 2009/0067440 | A1 | 3/2009 | Chadda | |
| 2011/0050713 | A1* | 3/2011 | McCrary | G06F 9/3851 |
| | | | | 345/522 |
| 2013/0156094 | A1* | 6/2013 | Syed | H04N 21/23424 |
| | | | | 375/240.02 |
| 2013/0262694 | A1* | 10/2013 | Swaminathan | H04L 65/4084 |
| | | | | 709/231 |

* cited by examiner

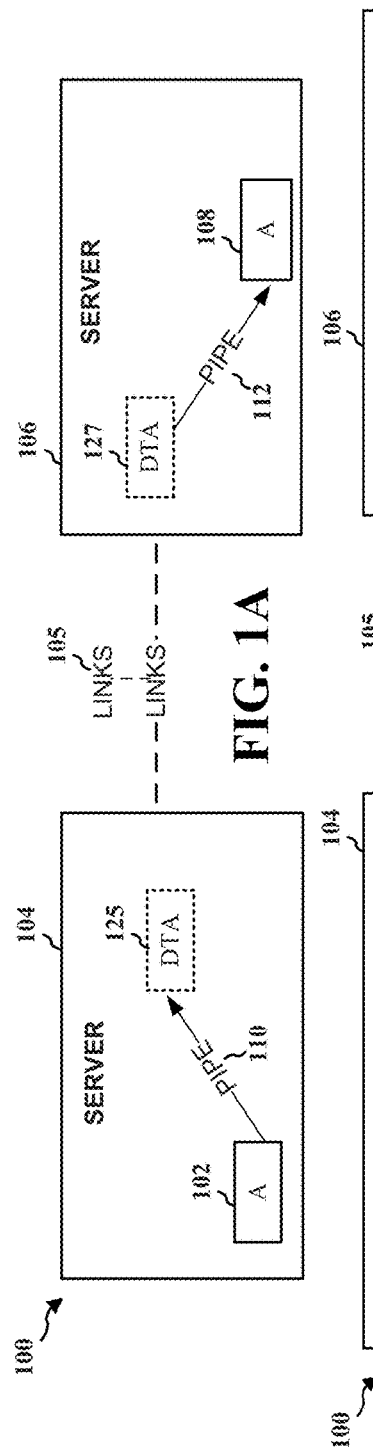
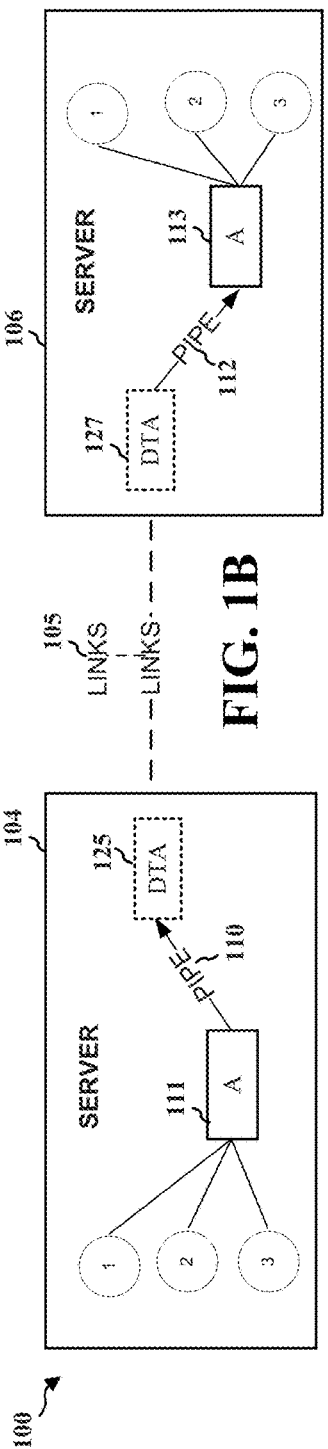
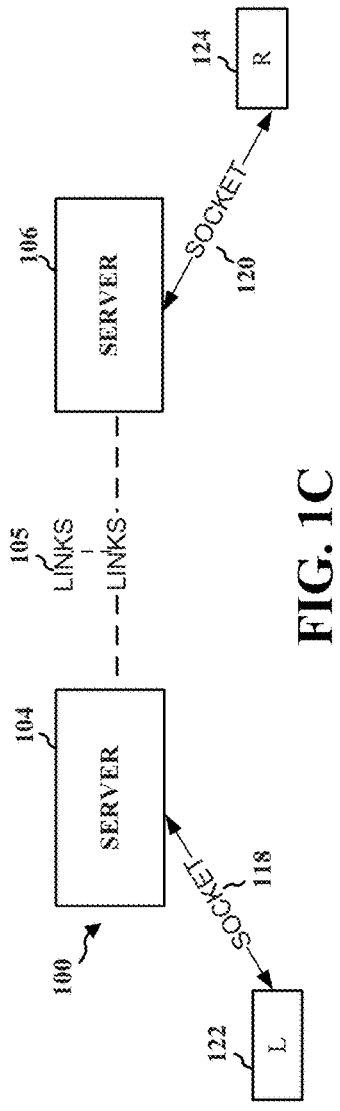
FIG. 1A
FIG. 1B
FIG. 1C

ACCELERATED DATA TRANSFER USING THREAD POOL FOR PARALLEL OPERATIONS

BACKGROUND

Field

The present disclosure relates generally to data systems, and more particularly, to techniques for accelerating the transfer of data across a network.

Background

Current file transfer technologies include the file transfer protocol (FTP). FTP is a protocol that enables a user to retrieve files from a remote location over a TCP/IP network. The user runs an FTP client application on a local computer, and an FTP server program resides on a remote computer. The user logs into the remote FTP server using a login name and password, which the server then authenticates.

In transferring files across the network, standard FTP implementations have limitations that render them unable to effectively utilize the available network bandwidth or to minimize the adverse impact of transmission latencies. For example, a conventional file transfer system using FTP transmits the file as a single stream of data from an FTP server to a requesting client. FTP throughput is consequently limited by the transmission rate of this serial stream. Further, the serial nature of the FTP protocol means that it is typically unable to fill every frame in the stream with data, resulting in unused bandwidth during a file transfer. The FTP protocol also does not account for the type of data being transferred (e.g., raw data versus structured data, etc.) in a manner that would increase transmission efficiency based on different data types. Rather, FTP simply packetizes the data and transmits it over an available time slot. This activity often results in frames having packets with smaller data payloads than otherwise may be possible, causing more latency.

Frame size may also reduce overall FTP throughput because each layer of the network stack adds overhead information to the actual user data. Where smaller data packets are transmitted, more overhead is present. Additionally, the TCP window size parameter defines how much data a transmitter can send at one time. The TCP window as implemented in FTP is generally a fixed value and does not vary based on factors such as network bandwidth or latency. The window size often affects the receiver's link capacity, since it dictates how much data can be transmitted over the link and therefore successfully received at the destination. FTP implementations using acknowledgment (ACK) mode also require that the FTP server await an ACK message or a negative acknowledgement (NACK) for each packet prior to performing any necessary packet retransmissions. This waiting period contributes to additional round-trip latency, further affecting FTP overall throughput.

These and other limitations are addressed in the present disclosure.

SUMMARY

In an aspect of the disclosure, a method, a computer program product, and an apparatus for transferring data are provided. The apparatus includes a memory having code stored therein, and a processor coupled to the memory and configured to run the code as a plurality of threads of execution, wherein the processor is configured to use the threads to read a plurality of data streams from at least one external source, combine the data streams into a single stream, divide the single stream into fragments, process each of the fragments in parallel to produce a corresponding data packet, and output the data packets as a plurality of parallel data streams for transmission by a transceiver over a network to a remote host.

In another aspect of the disclosure, an apparatus for transferring data includes a processing system configured to run code stored in a memory of the processing system as a plurality of threads of execution, use the threads to read a plurality of data streams from at least one external source, combine the data streams into a single stream, divide the single stream into fragments, process each of the fragments in parallel to produce a corresponding data packet, and output the data packets as a plurality of parallel data streams for transmission by a transceiver over a network to a remote host.

In another aspect of the disclosure, a method of transferring data includes reading a plurality of data streams from at least one external source, combining the data streams into a single stream, dividing the single stream into fragments, processing each of the fragments in parallel to produce a corresponding data packet, and transmitting the data packets as a plurality of parallel data streams over a network to a remote host.

In another aspect of the disclosure, a computer program product includes computer program product including a non-transitory computer-readable medium having computer executable code for reading a plurality of data streams from at least one external source, combining the data streams into a single stream, dividing the single stream into fragments, processing each of the fragments in parallel to produce a corresponding data packet, and outputting the data packets as a plurality of parallel data streams for transmission over a network to a remote host.

Additional advantages and novel features will be set forth in part in the description that follows, and in part will become more apparent to those skilled in the art upon examination of the following or upon learning by practice thereof.

BRIEF DESCRIPTION OF THE DRAWINGS

FIG. 1A is a diagram illustrating pipe forwarding used in a transfer of raw data between applications at different locations.

FIG. 1B is a diagram illustrating pipe forwarding used in a transfer of archived files between applications at geographically diverse locations.

FIG. 1C is a diagram illustrating socket forwarding used in a data transfer between applications at different locations.

DETAILED DESCRIPTION

Figure 2:
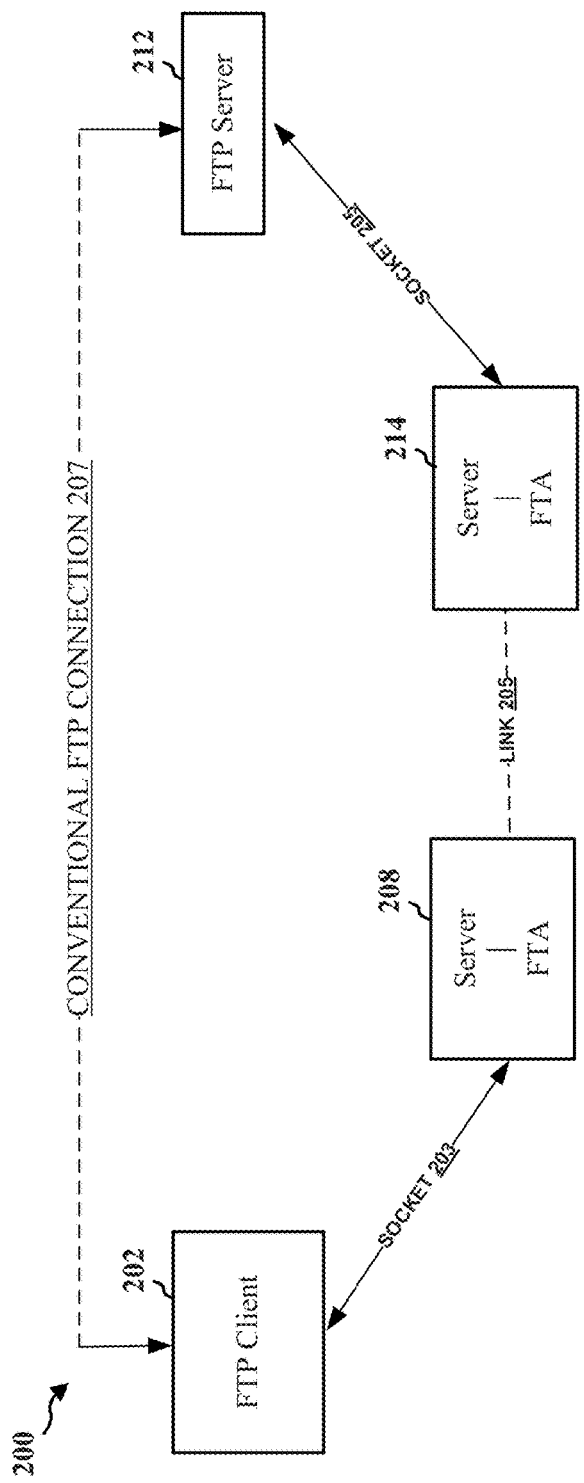
FIG. 2 is a diagram illustrating an engine for high speed data transfer.

The detailed description set forth below in connection with the appended drawings is intended as a description of various configurations and is not intended to represent all the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of systems for data transfer will now be presented with reference to various apparatus, methods and computer program products. These apparatus, methods, and computer program products will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute code. Code shall be construed broadly to mean software, instructions, instruction sets, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer. Computer-readable media may include forms of non-transitory tangible media and transitory propagating signals.

Pipe forwarding will now be described. A pipe is a communication channel that may be used for one-way communication between processes. Using a pipe, the output of one program or command may be provided as the input to another. A pipe is a one-way connection. Generally, a pipe operates in the context of applications that are local relative to one another, e.g., as a pathway between two processes on a single computing machine.

In an aspect of high speed data transfer, power port forwarding of data across networks includes pipe and socket forwarding as applied to a file transfer engine for transparently sending data between local and remote locations. Pipe forwarding is disclosed, which provides a one way vehicle for the transmission of data between computer processes. For example, in one aspect of the disclosure, data at the output of an archiving (or other) application may be provided via a pipe to a data transfer application (DTA), where it may be transferred via a network to a data transfer application at a remote destination, where it may be transferred via a pipe to an archiving (or other) application.

Socket forwarding as described herein provides a mechanism for the bi-directional flow of data or files between a first site over a socket and a data transfer application at a second site. For instance, the data or files may be sent via a first socket from a file storage application to a data transfer application on a different machine. The data or files may further be sent over a network, across an intermediary link coupled between two or more server apparatuses embodying data transfer applications, received at a data transfer application at a remote machine and received via a second socket at the file storage application. Since sockets may provide a remote connection, the two applications coupled via the socket need not reside on the same machine.

FIG. 1A is a diagram illustrating such a pipe forwarding configuration in the context of a data transfer between apparatuses embodying applications at two geographically diverse sites. Shown is application 102 at a local site, application 108 at a remote site, high-bandwidth data transfer apparatus 104 (described further below), and high-bandwidth data transfer apparatus 106. Apparatuses 104 and 106 may each constitute, in one embodiment, a server computer running one or more applications. Apparatus 104 is connected over the network to apparatus 106 via one or more links 105 established by apparatus 104 and/or apparatus 106.

Links 105 represent the network pathways designated to carry data between servers 104 and 106 over a network. A link is a distinct bi-directional data path for network traffic between two endpoints (usually two separate hosts connected via a network). The link uses a data transfer application (such as described herein) to deliver data between the link's endpoints.

No theoretical limit to the number of links that may be established and maintained. Links are persistent, but use no CPU resources while not in use. Each link can be configured with a set of capabilities including, for example, describing the source and destination service and the additional data transforms to be employed. Links may be used to transfer a set of files and directories for replication. A link is agnostic to the data type traveling through it. In one configuration, links are bi-directional, providing simultaneous data movement in both directions, with both directions running at full available bandwidth. Multiple links carrying different data transfers can execute simultaneously. When services have no direct LAN/WAN connection to a desired destination service, virtual links may be created by routing data through existing links without sacrificing performance.

The links are configured to operate over a connected network protocol layer, such as TCP/IP. A connected protocol ensures delivery of data using the data transfer application, and TCP is such a protocol. A single link may include one or more input data streams and one or more output data streams, as described below. Each data stream may be individualized in the sense that a stream has independent data and does not depend on another stream.

As an example, a 1 GB input stream may include 100 scattered files (structured data) and raw data (unstructured data) between the files. Considering the stream to be one flat sequence, the stream includes segments that may include portions of files, portions of directories, and code. As the DTA reads the data received from one or more external sources, it encodes the data into this stream. The data is then packetized and sent in parallel to the network as described below.

Two machines running the DTA as described herein may be connected by multiple links over a network. That is, the DTA can operate multiple links in parallel simultaneously. However, because links are distinct data pathways, they do not inter-mix data with other links in the pipeline. Thus, each packet transferred over the network starts and ends within the same LINK pipeline.

In an embodiment, a DTA link includes the following threads of execution in order of the DTA pipeline order: input threads (e.g., readers, encoders, etc.); transformer threads (e.g., differencers, digesters, compressors, ciphers, etc.); data sending threads; data receiving threads (used for receiving data over a link from a remote source); network threads (which may use a separate protocol outside of the DTA); data de-transformer threads (e.g., deciphering threads, decompressors, digesters, etc.); and output threads (e.g., decoders and writers).

The network may include any network topology including a wide area network (WAN), a metropolitan area network (MAN), an intranet, the Internet, a virtual private network, or the like. Applications resident on either or both of apparatuses 104, 106 may configure the properties of the links 105 as discussed below. Applications 102 and 108 may reside on computers in different geographical regions or different locations within a region. Applications 102 and 108 may be any number of types. By way of example, application 102 may be a web server and application 108 may be a web browser. Pipes 110 and 112 are local to apparatuses 104 and 106, respectively, such that application 102 is on the same machine as apparatus 104 at the local site, and application 108 is on the same machine as apparatus 106 at the remote site. Application 102 and the DTA 125 on apparatus 104 communicate via at least pipe 110, and application 108 and the DTA 127 on apparatus 106 communicate via at least pipe 112. Apparatuses 104 and 106 collectively constitute a data transfer engine in this example.

More specifically, in server 104, application 102 is coupled to and provides output data to DTA 125 via pipe 110. DTA 125 may constitute an application, or a suite of applications or function calls for accelerating the transfer of data across a network. Similarly, DTA 127 is coupled to and provides output data to application 108 via pipe 112.

In FIG. 1A, a stream of raw data is sent from application 102 to application 108. In this example, data at the output of application 102 is transferred to DTA 125 in apparatus 104 via pipe 110. The data is then transmitted by apparatus 104 to apparatus 106 via a transceiver at apparatus 104, a transceiver at apparatus 106, and one of links 105. A single link is involved in any single file transfer, including in situations where that single file transfer requires multiple input streams in parallel. Pipe 112 transfers the data from server 106 as an input to application 108.

In the example of FIG. 1A, the data may be of any type and need not have a specific syntax. In addition, apparatus 104 receives the data and transmits the data over links 105 to apparatus 106 in a manner that is transparent to applications 102 and 108. That is, from the perspective of these applications, the data transfer may be viewed as a local process-to-process transfer. Via inclusion of apparatuses 104 and 106 and links 105, the pipe 110 is effectively extended between two geographically-distinct regions to provide a data transfer capability, and the data is thereby provided to application 108 as if the data had originated locally.

Because pipes 110 and 112 do not require a specific file type or syntax, the data may be transferred as raw data. That is, the data in one configuration may simply be streamed and not viewed as separate files by the servers or other entities responsible for the data transfer process. The transmission of raw data can increase the transfer speed of files because in many cases no additional processing, for example based on variations in data type, needs to be performed on the data being transferred.

FIG. 1B is a diagram illustrating pipe forwarding used in a transfer of archived files between applications at geographically distinct locations. FIG. 1B is similar to FIG. 1A except that applications 102 and 108 in FIG. 1A represent archive programs 111 and 113 in FIG. 1B. In FIG. 1B, three files 1, 2 and 3 are provided to archive program 111 for compression. The resulting archived file is output from the archive program 111 to pipe 110 and provided to the DTA 125 at apparatus 104. The file is packetized and transmitted via a transceiver in apparatus 104 over one of the links 105 to the transceiver at apparatus 106 at the destination, where it is provided to DTA 127 and transferred via pipe 112 to archive program 113. The files are extracted by archive program 113 and are reproduced at the destination as the original three files. In this file transfer, as in the example of FIG. 1A, archive program perceives the archived file as originating locally, at the destination.

For the configuration in FIG. 1B, archive program 111 may be the same program as, or otherwise related to or compatible with, archive program 113. In such role, archive program 113 may perform the same operation on the data in reverse to effect the file extraction. In one configuration, with reference to FIG. 1B, the archived file at the source is not written back to non-volatile memory (such as a hard disk) and instead is immediately sent after archiving, via apparatuses 104 and 106, to the destination. Further, when the archived file arrives at the destination, the archived file need not be written to nonvolatile memory but instead may immediately be extracted via archive program 113. As a result of the omission of writing steps at the source or destination, the file transfer process is very fast.

Because the data that is traversing links 105 in the pipe forwarding examples of FIGS. 1A and 1B is treated as a data stream rather than as a file or group of files having particular attributes, no file-specific operations need be performed on the data passing through the network.

A socket is an endpoint in a bridge connection between remote peers. Sockets may be created and used with a set of programming requests, and are often used to perform operations in a network configuration. Sockets may be used to send and receive data over networks. Unlike a pipe, a socket is bi-directional and allows for simultaneous reads and writes. This feature allows for sophisticated protocols to be realized on a network via the use of sockets. Additionally, whereas pipes essentially operate on raw data streams, sockets may send complex data having different protocols and complex commands.

In another aspect of high speed data transfer, a socket forwarding technique is disclosed which enables the transfer of data or files between remote locations. Sockets provide bi-directional remote communication capability. Accordingly, as noted above, local site 122 may be at a different site from that of apparatus 104, and remote site 124 may be at a different site from that of apparatus 106.

FIG. 1C is a diagram illustrating socket forwarding used in a data transfer between applications at different locations. Between apparatuses 104 and 106 at the source and destination, respectively, files and data may be transferred via the reading or the writing to the respective sockets 118 and 120. As noted above with reference to the pipe forwarding examples of FIGS. 1A and 1B, apparatuses 104 and 106 and links 105 in FIG. 1C also serve as a conduit for the data passing across the network in a manner that these apparatuses and links are transparent to the source and destination applications. As an illustration, in the case of socket forwarding where the underlying socket being forwarded is based on the hypertext transfer protocol (HTTP) and the file to be transferred was obtained from the Internet, each packet associated with the file may be routed through links 105 from source to destination. In the case of a web browser at local site 122 (FIG. 1C), the file may be passed from the browser to the destination at remote site 124 without the browser's knowledge that the data was passed through the intermediate network and apparatuses 104 and 106. In this case, the sockets between both peers are effectively hijacked by apparatuses 104 and 106 such that the relevant applications at local and remote sites behave as if they are communicating directly with one another when in fact they are passing data between different locations through a network. Because this transparency means that the amount of processing time of the data may be reduced, file transfers may be accelerated over the network. In sum, the use of pipe-forwarding and socket-forwarding as described above in the context of a file-transfer engine allows for the acceleration of the file transfers via one or more transparent intermediary entities on a network.

In another aspect of the disclosure, a high speed data transfer system is provided in which a serial data stream is accelerated over a transparent server configuration as a group of parallel data streams transmitted across a network link.

FIG. 2 is a diagram illustrating an engine for high speed data transfer. An FTP client machine 202 and FTP server 212 are shown with a conventional FTP connection. While the client shown in this example is FTP, other types of protocols may be contemplated. In one implementation, such a protocol may be one involving the transfer of data or files across a network such as the illustrated FTP protocol, an SSH protocol, a web browser/server, and the like. Client 202 is coupled to data transfer application DTA 208 via socket 203. FTP server 212 is coupled to DTA 214 via socket 205. In a conventional FTP file transfer, a file transfer may be initiated by FTP client 202 for a transfer of a file from FTP server 212 over a conventional FTP connection 207.

In an aspect of the disclosure, the external protocol (here, FTP) is tunneled through the DTA protocol resident on machines 208 and 214 in an encapsulation scheme. That is, while FTP client 202 and FTP server 212 may have their own established connection 207, DTA in effect hijacks the path between FTP client 202 and FTP server 212 such that data and files are passed via link 205 over a network between DTA 208 and 214, and then routed via sockets 203 and 205 to the destination. The process is transparent to the client and server, which may be unaware of the fact that the data is being transferred over the socket and link connections governed by DTA 208 and 214.

Figure 3:
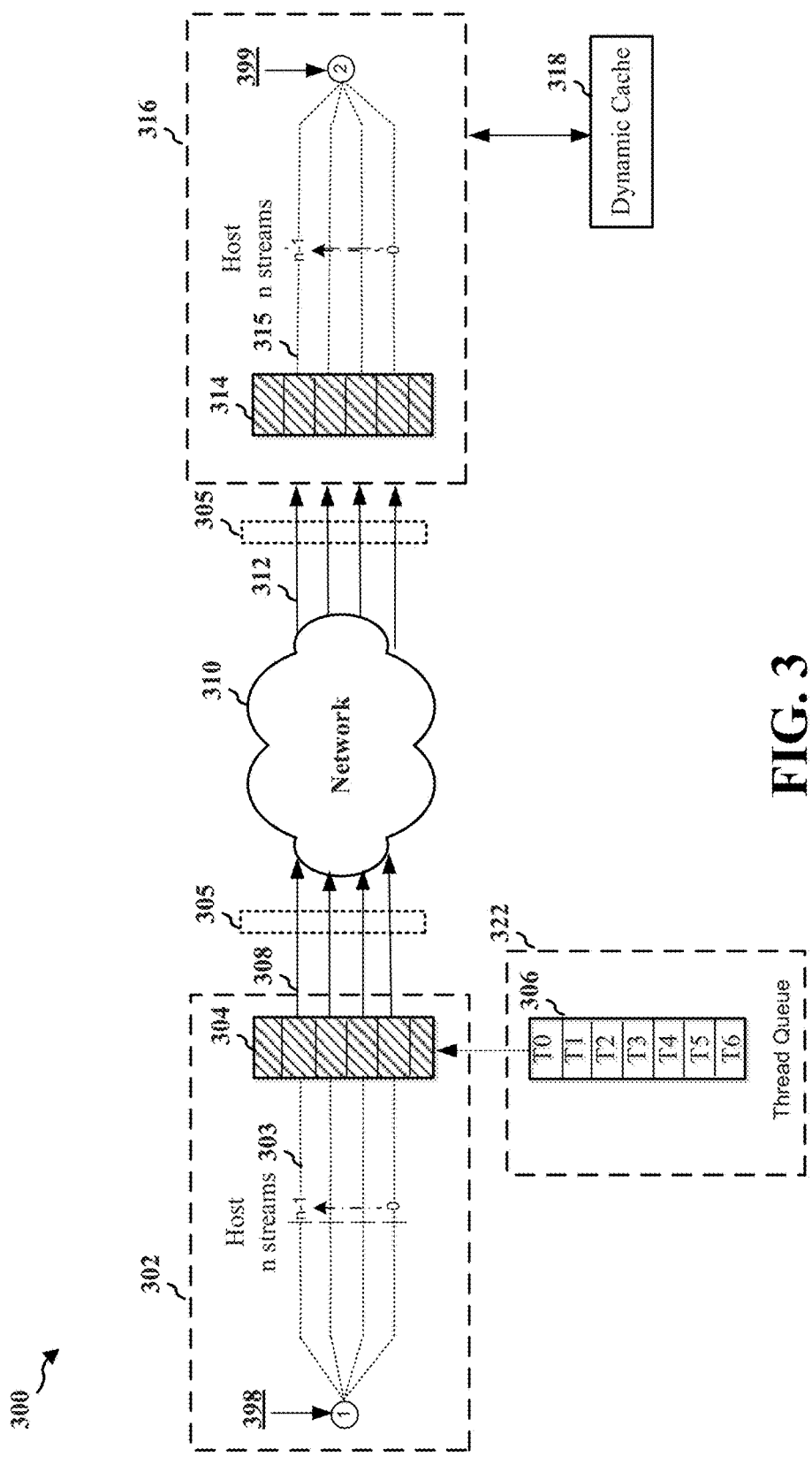
FIG. 3 is a diagram illustrating another configuration for high speed data transfer.

FIG. 3 is a diagram illustrating another configuration for high speed data transfer. In this example, hosts 302 and 316 represent apparatuses for data transfer including data transfer applications as described with respect to FIG. 2. Host 302 may reside on a computer including a processor, memory, network interface, and the like. For purposes of this description, the term "processor" may refer to a single processor or multiple processors such as, for example, a group of co-processors, a general purpose processor, a dedicated processor, a group of dedicated processors, a group of processor cores, processors distributed on different machines, or some combination thereof. The processor may be implemented as a processing system. Host 302 may also include a memory which may include, for example, main memory and non-volatile memory. The processor may be configured to run code in memory that corresponds to a data transfer application.

The processor of hosts 302 and 316 in FIG. 3 may retrieve code stored in a memory (main memory, cache memory, etc.) and execute the code as one or more threads of execution on the processor. A thread of execution ("thread") describes a single sequential flow of control within a program. In one embodiment, a thread constitutes the smallest sequence of programmed instructions that can be managed independently by a scheduler, which is typically a component of the operating system. The process scheduler includes the component that is responsible for deciding whether the currently running process should continue running and, if not, which process should run next. The thread scheduler is typically responsible for sharing the available processor(s) between the various threads. The threads of a process share its instructions (executable code) and its context (the values of its variables at any given moment, such as thread ID, private storage area, the register set, a stack, etc.).

On a single processor, multithreading may be implemented by time-division multiplexing whereby the processor switches alternates between threads. This is known as context switching. With the speed of modern processors, context switching typically happens fast such that the threads appear to be executing in parallel. On a multiprocessor or a multi-core system, threads can be executed in a true parallel manner because every processor or core can execute a separate thread simultaneously. Additionally, to effect multiprocessing, the operating system may use hardware threads that exist as a hardware-supported method for better utilization of a particular CPU or dedicated processor (e.g., DSP, programmable array logic, etc.).

Within host 302, an input data stream 398 of segmented data is created from one or more data streams, e.g., received from one or more sources. Thereafter, the data stream is fragmented, packetized, and converted into one or more output streams as described herein. As part of this process, the processor selectively retrieves from queue 322 in the memory code corresponding to one or more of a plurality worker threads 306 (T0-T6). In one embodiment, as part of the process of converting data received from external sources to an input data stream 398, the processor in host 302 uses a read thread to read the incoming data streams and an encoding thread for encoding the stream into segments and archiving the data.

The resulting input data stream 398 may include various segments of data, file chunks, and code. In one embodiment, input data stream 398 is configured by the processor to be a logical representation of a data stream which the DTA may perform further operations on as described below. More generally, the input stream is a set of data segments arranged in serial order. The stream may include any number of different types, including block data of files and folders, pipe data, device data, and the like.

The processor retrieves and executes additional threads to operate on the input data stream 398 by dividing the input data stream 398 into n fragments as shown by lines 303. The size of the fragments may be determined in advance or in some other fashion by host 302, as discussed further below. The code corresponding to the pool of threads 306 and memory 322 may reside on host 302 and may be part of the data transfer application running on host 302. In addition, code corresponding to a separate thread pool (not shown) may reside on host 316 on the remote side of network 310. Thereupon, each fragment of the incoming serial data stream is stored in a buffer location 304 in memory. In one aspect of the disclosure, a ring buffer is used. Each fragment may correspond to a separate buffer, the latter of which also may be used herein to refer to a memory location within a buffer. Each of the stored fragments is processed in parallel by selected worker threads to produce a corresponding data packet. The packets are then written back into the respective buffers. In one configuration, each packet is placed in a separate buffer. Packets may be retrieved from the buffers and processed further, and then written back to buffers for subsequent retrieval and possible further processing steps.

In addition to the reading, encoding and archiving steps described above, further processing steps may include, for example, packetizing, encrypting, error-correcting, differencing or compressing of the data, and like functions. The processing step may also include configuring information for recreating the correct order of the packets once they reach their destination in order to reproduce the resulting file. In an embodiment, the responsible threads may be employed to encode the fragments and packetize them, and the packets are placed back into locations in the ring buffer. In addition, the responsible threads may encode the fragments to produce one or more segments. Each packet may include one or more segments as discussed below. Once the processing of the packets is complete, threads in the pool retrieve the packets from the buffer locations and output them for transmission by a transceiver associated with host 302.

To facilitate use of bandwidth, the packets may be transmitted as a parallel set of output data streams 308, 312 over the link 305 from host 302 across the network to host 316. The parallel streams of packets are received over links 305 at host 316 and stored in buffer 314. The processing steps performed at host 302 are then reversed by the processor and by the plurality of threads at host 316. For example, the packets may be decoded, decompressed, decrypted, reordered and aggregated as n data streams 315. In the reordering scheme, host 316 may use a dynamic cache 318 to temporarily store packets while retrieving the correct order information and reordering the packets.

The packets may be variable length and may include multiple segments encoded in series in the packet. The segments may include ordering, encoding, routing, control, and data operation information.

A fast (e.g., nanosecond grade) MPMC (multi-producer multi-consumer) queue may be used for passing the packets through the pipeline by each worker thread as further described below. This MPMC technique allows for processing HT packets in parallel. The packets may be taken (allocated) from a ring buffer, whose size is determined based on the network bandwidth and latency and performance requirements.

A DTA stream, such as the input streams 303, 315 and output streams 308, 312, enables the efficient and accelerated transfer of data. A stream of serial packets or segments can be of any length. As described herein a stream can contain any number of originally distinct data encoded into one stream.

Each reader thread encodes one input stream. Each input stream includes a HEAD and TAIL, which is acknowledged by the DTA. This way it is ensured that the stream was transmitted properly. It also provides for much higher performance provided that the external devices where the data originates are fast enough to keep base with the DTA encoders. In essence, the encoders create a stream out of otherwise ordinary or fragmented data such as small files, and transmit them as a stream. The DTA may be configured to transmit its own stream at a very high rate. In one configuration, the other end of the link 305 at host 316 only needs to decode the stream and arrange the fragments back in order, but by the time this decoding step takes place, the acceleration is accomplished already.

The entire process is further accelerated by the fact that all the transforms to the data as conducted by the worker threads occur over the stream, and not on the original pieces of data.

In addition, the ordering array as described in the embodiment herein may be performed on the stream, rather than the fragments. This operation renders an even more efficient transport pipeline.

In one embodiment, the processing of a serial data stream is as follows. Data streams may be processed simultaneously as fragments by DTA over a single link, since there may be multiple input (read) threads. Each read thread generates a packet as described above and encodes it with ordering serial index SI, stream number SN, and routing information. Then the packet goes through the pipeline in a contentious way until it reaches the decoder on the other end of the pipeline (resident at the destination host 316).

Here the packet is ordered. An out of order packet is stored in a special ordering array until the next packet is received. The next in-order packet is the one with the next SI. An in-order packet is either routed to another worker by the DTA at the destination host 316 or it is passed to the appropriate writer thread with the corresponding stream via the stream number SN. The packets are written to memory where they may be sent to one or more external destination sources (such as FTP server 212 of FIG. 2).

The ordering algorithm is either on-demand or limited. In order to keep the pipeline at the peak throughput, more buffers (empty packets) may be necessary on the receiving side to allow space for ordering (storing) out of order packets. In an embodiment, the DTA initially allocates the same number of buffers in the ring buffer on each end. The DTA then allows the allocation to grow as necessary as more packets are received out of order. As latency grows on the network, and if availability of data on the input reader threads varies wildly, the ring buffer could grow quite large due to highly out of order packets. In this situation, if memory requirements are important, the ordering can be limited. With limited, ordering the DTA may send a suspend signal to the input readers when the ordering reaches a pre-defined high limit. The DTA then may suspend operations and wait until the ordering comes back to below a threshold. In this manner, the memory usage of the system may be controlled.

For the transfer engine in FIG. 3, the number and types of worker threads to be employed may be selected to optimize data transfer events based on factors such as network bandwidth and latency, and in some cases anticipated data types or other factors. Further, in the above data transfer engine, the underlying transfer protocol employed at the servers may be optimized with a view to maximizing the effective use of available bandwidth and minimizing the impact of latency. The transfer engine accelerates file transfer operations by taking a stream of data, sending it over multiple streams and reconstructing it at the destination. In an embodiment, the protocol uses the concept of segments to assist in maximizing the acceleration of the data transfer. As noted above, fragments may be encoded into segments depending on the data type. For example, segments may correspond to data having a specific data type or file type. Segments are then concatenated together to form a packet in a manner that may maximize use of the available bandwidth. In one configuration, a data packet may include a packet header and a data payload. The data payload, in turn, may include one or more segments. Each segment also may have a header and checksum associated with it in addition to its own data payload. This enables information such as segment order or data type to be maintained with the segment. For a stream having a single data type, a single, long segment may substantially populate the entire data payload of the packet. This long segment requires only a single segment header to be included in the packet (in addition to the packet header). By contrast, the transfer engine may produce a string of shorter segments, each composed of structured data having a defined data type and separate headers to form the data payload, and concatenate segments in the string together to form the packet's data payload. In either case, using the segments as part of the defining transfer protocol, packets may contain more data, resulting in a higher use of the transmission bandwidth. Thus, when a host receives a serial stream of data and fragments the data into a quantity of parallel streams, it may process the fragments by encoding them based upon segments, packetizing the segments in a manner that maximizes the data transmission efficiency, and performing other processing operations (e.g., addition of checksums, encryption, and the like) before outputting them for transmission over the network. This is in contrast to a situation where the data segments are fixed in length, which can limit transmission efficiency, particularly where the segments could have been longer and thus the resulting packet would have required less overhead (e.g., fewer headers).

Segments may include data segments and command segments. The command segments may include control information, information relating to the engine's transfer protocol or other information not part of the file/data being transferred.

The transfer engine may use a variable length fragment or packet, in addition to a variable length buffer size. Further, unlike in FTP, servers using the transfer engine need not wait to receive an ACK or NACK prior to sending the next packet. Instead, the next scheduled packets may be transmitted immediately as available. Anticipated lost packets may also be transmitted without awaiting an acknowledgment. Another parameter that may be adjusted by the transfer protocol includes the TCP window. The value of the TCP window may be either a predetermined value to accommodate a particular network configuration, or it may be adjusted on the fly. In addition, the transfer engine may control the number of parallel streams as well as the number of parallel links over which the streams may be transmitted. The number of streams need not equal the number of links. For example, a single stream of raw data may be transmitted over more than one link. In addition, the threads may archive multiple files into a single stream. Generally, the number of physical streams will depend on a number of factors, but ordinarily will be decided in a manner such that each such stream can be kept as busy as possible. Generally, fragments corresponding to data being received at a higher data rate will be allocated a greater number of buffers, and fragments corresponding to data being received at a lower data rate will be allocated a fewer number of buffers. In this manner, bandwidth may be optimized to accommodate both fast and slow data streams (e.g., different files within the serial data stream).

Figure 4A:
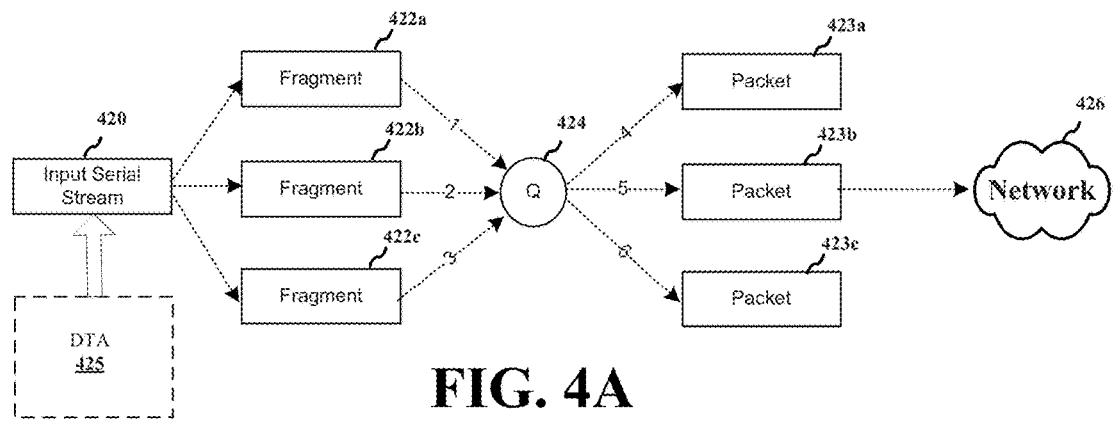
FIG. 4A is a diagram illustrating the packetizing of a data stream.

FIG. 4A is a diagram illustrating the creation and packetizing of a data stream. In an embodiment, DTA 425 creates an input serial stream 420 and then packetizes the stream. Data fragments from a serial stream 420 are read into a resulting fragmented data stream. The data and code associated with the fragments are placed into one or more segments and then packetized. Then the threads do their work on the packets as described below.

Arrows 1-6 represent movements of streams of data, with arrow 1 corresponding to a stream including fragment 422*a*, arrow 2 corresponding to a stream including fragment 422*b*, arrow 3 corresponding to a stream including fragment 422*c*, arrow 4 corresponding to a stream including packet 423*a*, arrow 5 corresponding to a stream including packet 423*b*, and arrow 6 corresponding to a stream including packet 423*c*. Serial stream 420 is deconstructed into fragments 422*a-c*, which are in turn encoded into packets and stored in buffers as described above. The fragments are placed in a queue position 424 for parallel processing by the string of worker threads, as further described with respect to FIG. 4B, below. The resulting packets 423*a-c* are then transmitted across the network. Here, once the fragments 422*a-c* are reinserted into the queue 424 via parallel streams 1, 2 and 3 and after the packets are processed by the pool of worker threads they may be transmitted via any stream 4, 5 or 6 and onto the network. The flexibility in not requiring particular packets to remain on a particular stream allows the streams to be kept as busy as possible.

Using the above-described technique, multiple external streams of data from multiple sources may be encoded into one stream to effect highly efficient pipeline operations and the significant acceleration of data.

Figure 4B:
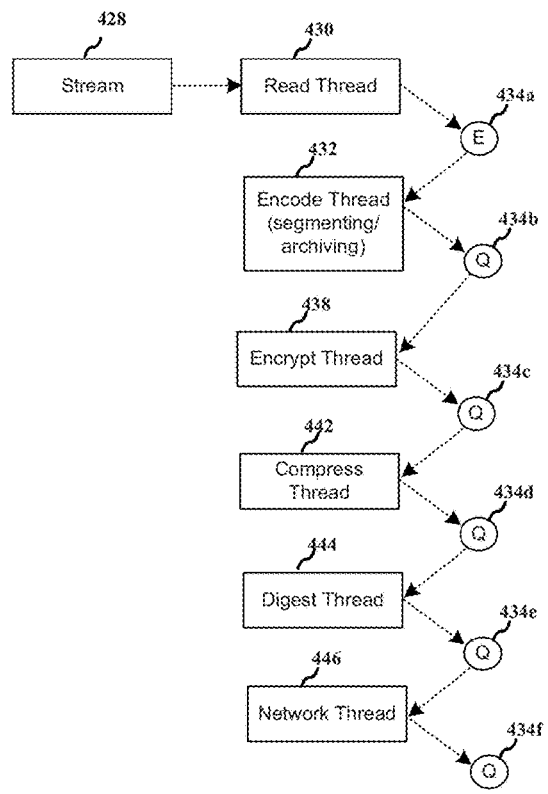
FIG. 4B is a diagram illustrating the operation of worker threads on queued data.

FIG. 4B is a diagram illustrating the operation of worker threads on queued data. The queue as described herein reads one or more data stream from memory or from external devices, encodes the streams into a single input data stream having multiple segments, divides the stream into fragments, and packetizes the fragments to produce a corresponding number of output data streams which are then transmitted over the link. The resulting fragments/packets are placed into multiple queues which are concurrently accessible by and processed by multiple threads. This facilitates faster data processing and hence accelerates data transfer. Data stream 428 is fragmented and the fragments are processed by the various threads as illustrated in the following example. The threads processing or otherwise operating on the data in this example include read thread 430, encode thread 432, encrypt thread 438, compress thread 442, digest thread 444 and network thread 446. More than one thread may exist for identical functions. Read thread 430 may retrieve data from external sources E 434*a*. Thereupon, the queue works such that once one thread completes its operation, another available thread in the pool may immediately access the fragment/packet and may perform an operation corresponding to that other available thread. Thereupon, the packet is freed up again and another thread may perform another necessary task on the packet, and so on until the packet is ready for transmission. Continuing with the example shown, after the read thread 430 retrieves the data, and encode thread 432 segments and archives the data, the data is represented as a serial stream. Thereupon, the data is divided into fragments, with each fragment containing the one or more segments is available at queue position 434b. The data is now available in the form of a plurality of parallel streams. As it is available, data is fed each of the buffers so that the plurality of parallel streams may efficiently carry a maximum amount of data where necessary. The one or more segments are processed to produce a corresponding data packet. For example, an available encrypt thread 438 may encrypt the packet, and the encrypted packet is placed in queue position 434c. The compress thread 442 may compress the packet in queue position 434c, and the packet is then available in queue position 434d. In some implementations the compression step may take place in connection with other steps, such as the archiving or encoding steps. The digest thread 444 appends a checksum to the compressed packet and places the packet in queue position 434e. The packet is then ready to be transmitted, and network thread 446 schedules the packet for transmission on a data stream to the destination over the link Each packet retains its own identifier so that it can be properly reordered when it is received by the DTA at the other end of the network connection.

Using the protocol described in FIG. 4B, threads in the pool of threads are free to begin processing any available packet in the queue at any time. The traditional bottleneck associated with performing serial operations on a single packet may be substantially avoided. Once a packet is processed by a first thread, it is immediately available for processing by another necessary thread. Typically, a number of packets may be concurrently processed by a number of available threads in the pool. The number of threads and the number of corresponding packets on which operations may be performed can be determined by the transfer protocol in advance or otherwise on the fly. A determination of these parameters may be governed in large part by the bandwidth and latency conditions of the network on which the host apparatuses are operating. These parameters can be determined in software by measuring the network bandwidth, e.g., by determining effective data rates, and by measuring latency, e.g., by observing the round-trip delay of a packet. Other parameters that may be optimized based on bandwidth and latency measurements include buffer or packet size, number of parallel data streams, and TCP settings. Important TCP settings may include TCP window size, among others. In an aspect, the buffers are part of a ring buffer, which may be used so that no memory allocation is necessary when the processor is processing the packets.

Figure 5:
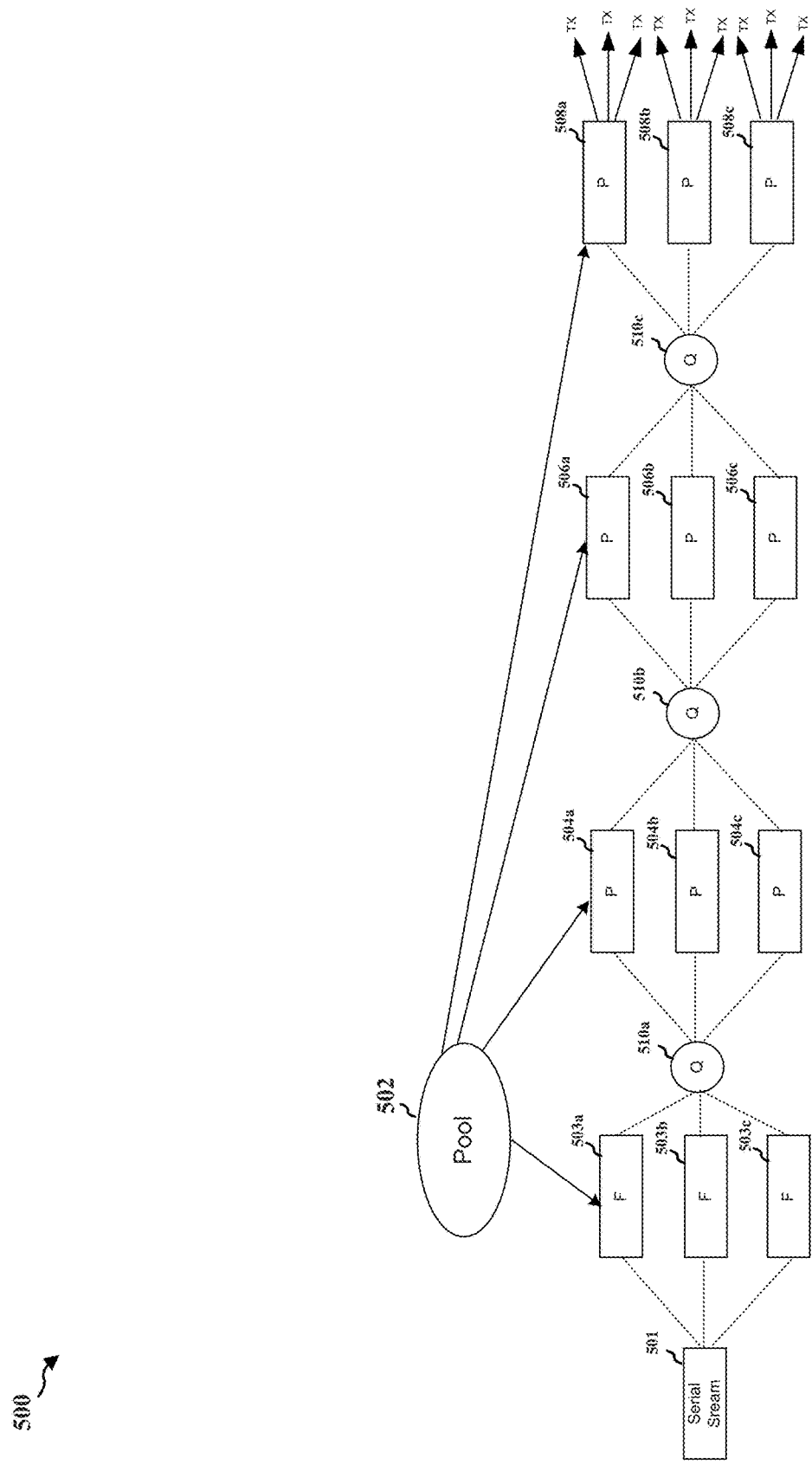
FIG. 5 is a diagram illustrating an example a pool of worker threads operating on queued data.

FIG. 5 is a diagram illustrating an example a pool of worker threads operating on queued data. Serial stream 501 is divided into fragments 503a-c. A first operation (e.g., encoding) is performed on each the fragments 503a-c by one or more threads in the pool 502, with each thread operating on a separate fragment. When the processing on each fragment is complete, it is placed into the next queue position 510a for a set of second operations, which need not be identical to one another. The resulting packets 504a-c are then available for further processing by threads in pool 502. The packets are placed in queue position 510b, are processed into packets 506a-c, which are placed into queue position 510c and processed into packets 508a-c before being transmitted over the links onto the network. In this example, each of the fragments/packets may be operated on by the relevant threads as soon as the processing by a prior thread is complete. Also, in this example as in FIG. 4, once a thread has completed a task on a packet it may immediately move along to process another available packet in the queue.

Figure 6:
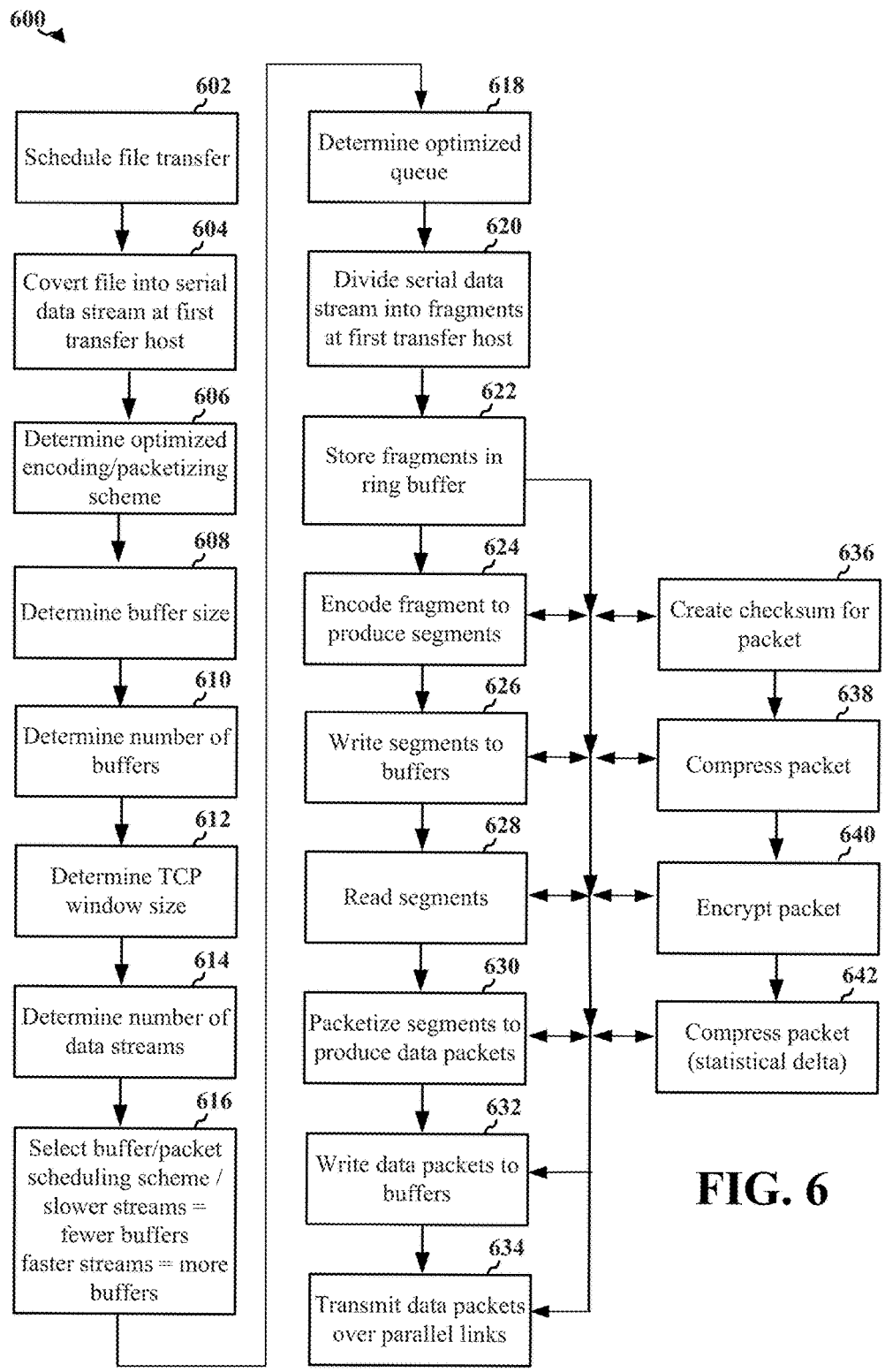
FIG. 6 is a flow diagram illustrating an example of a high speed data transfer from a local host to a remote host.

FIG. 6 is a flow diagram 600 illustrating an example high speed data transfer from a local host to a remote host. A file transfer is scheduled. One or more scheduled files from external devices are converted into a serial data stream at a first transfer host (604). The transfer host selects an appropriate encoding and packetizing scheme for use in the file transfer (606). The selection of an encoding and packetizing scheme may take place at any time prior to the file transfer. This selection may be based, for example, on a default value of the transfer protocol or may be a predetermined value that is selected based on data type or network parameters. In other configurations, the encoding scheme may be determined in substantially real-time. The host determines an appropriate buffer size and/or packet size (608), a number of buffers (610), a TCP window size (612), a number of data streams for use during the transfer (614), and a buffer/packet scheduling scheme (616). As noted previously, for slower streams with less data, fewer buffers are generally allocated, whereas for faster streams having more data, a greater number of buffers are typically required. In addition, more buffers are generally needed to accommodate more data streams. For example, eight (8) nodes require eight (8) buffers to keep the pipeline full. The buffer number is typically based on the number of worker threads available at the host (e.g., compression, encryption, encoding threads, etc.) as well as the number of data streams. Like in determining an encoding scheme (606), the determination steps in 610, 612, 614 and 616 may be preconfigured or instead may be made dynamically. Whether set as predetermined values or performed on the fly, determination of these parameters is generally performed to optimize transmission efficiency in view of the available bandwidth. Determining a buffer size (608) may be the result of experimentation based on the bandwidth and latency parameters of a network. In one implementation, for a network bandwidth in the range of 100 Mbit/s to 10 Gbit/s, a buffer size of 0.5 MB to 128 MB may be used. For determining a TCP window size (612), a 0.5 MB to 64 MB size may be used for a 10 GB/sec transmission line, and a 0.5 MB to 32 MB size may be used for a 1 GB/sec transmission line.

In addition to TCP window size, additional TCP setting may be adjusted to maximize efficiency of the transfer engine over the associated network. Additional relevant TCP settings include, for example htcp (congestion control algorithm), selective acknowledgement, and TCP no delay. In one implementation, flags for these settings are set to <on>. With reference to the number of data streams (614), the number in one implementation ranges between 1 and 18, with typical values around 6 or less. A primary determinant of the number of data streams is the desired transfer speed. In determining the packet scheduling scheme (616), an additional consideration includes whether or not the engine should send partial packets. The partial packets may be transmitted if speed and responsiveness are the primary concerns. Otherwise, the partial packets may be withheld until full packets are ready to transmit. Link auto-tuning may be employed whereby the transfer engine automatically determines latency and bandwidth, and uses that information to adjust the above parameters on the fly in response to changing link conditions. For example, link auto-tuning may intelligently add buffers as needed.

Continuing with FIG. 6, an optimized queue may be determined for use by the host (618), which parameter may be determined in advance or dynamically. The configuration of the queue includes, for example, the number and types of worker threads, and depends on factors like the number of data streams, network bandwidth and transmission latency. The serial data stream is then parsed as it is received, or divided into a number of fragments at the host (622). In one configuration, one or more responsible worker threads are retrieved by the processor receive the serial data stream and fragment them. The fragments are then provided to locations in the ring buffer. The host continues to receive the serial data stream and to fragment the stream and place the fragments in buffers as the buffers become available. The fragments are retrieved from the buffers, encoded to produce one or more segments (624) and then written back into available buffer locations (626). Generally, raw data includes a single segment, and structured data is segmented based upon file type or data type, as discussed above. The segments are retrieved (628) and packetized to produce data packets (630). The packets are then written to the buffers (632) for further processing. Additional processing steps by threads in the pool include a digest thread to create a checksum for the packet (636), an archive thread to archive the packet (638), an encryption thread to encrypt the fragment (640), and a compress thread to perform a statistical delta compression on the fragment (642). Additional or different threads may be employed in other configurations. Once the packet is ready to be transmitted, the host schedules the transmission of the packet on a specific data stream. The packet is then transmitted over one or more parallel data links (634).

The transfer software application in one implementation is flexibly embeddable on a number of different operating system platforms, and can run as a service that listens on all available ports. A corresponding graphical user interface or command line interface may be included for providing commands and adjusting parameters manually. The application allows simultaneous data movement in both directions across the bi-directional links, with both directions running at full available bandwidth.

Figure 7:
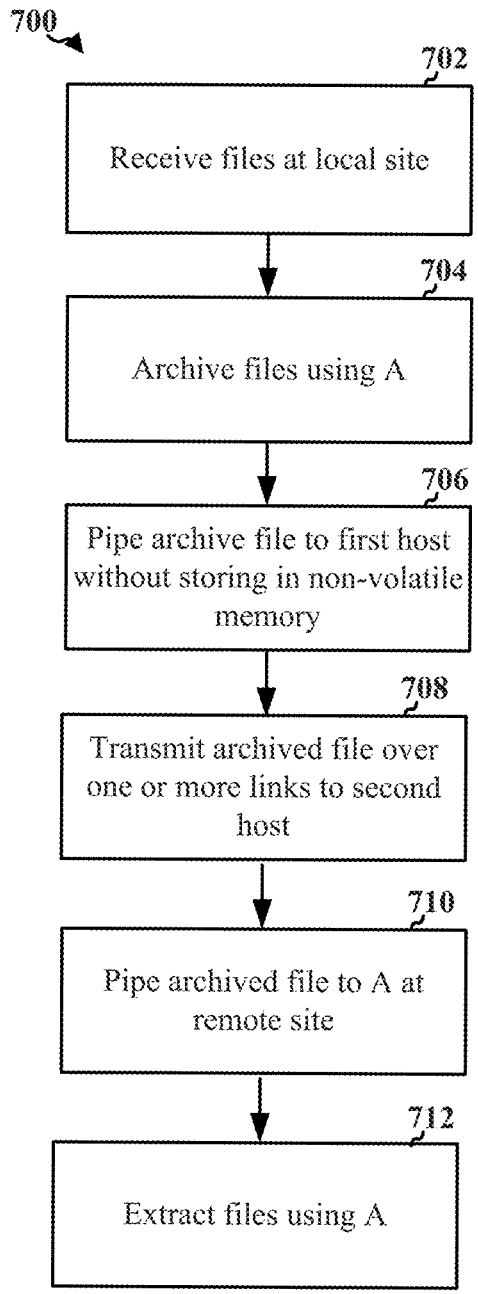
FIG. 7 is a flow diagram illustrating pipe forwarding using the file transfer engine.

FIG. 7 is a flow diagram 700 illustrating pipe forwarding using the file transfer engine. Files are received at a local site, such as a PC or workstation (702). The files are archived using archive application A (704). Thereupon, the archived file is sent over a pipe to a first file transfer host (706). As described above with reference to FIGS. 2-6, the archived file is transmitted over one or more links to a second file transfer host (708). The archived file is sent over a pipe to archive application A at the remote site (710). The files are extracted using A (712). In this example, because the transfer engine is transparent to the applications A at the respective local and remote sites and because the destination site includes the application A, the archived file may be piped immediately to the first host without the requirement that the archived file be saved to non-volatile memory. Similarly, the received archived file at the remote site may be immediately extracted without requiring that the archived file be saved at the destination. In this manner, the process of transmitting the archived file and extracting the original files at the destination is accelerated.

Figure 8:
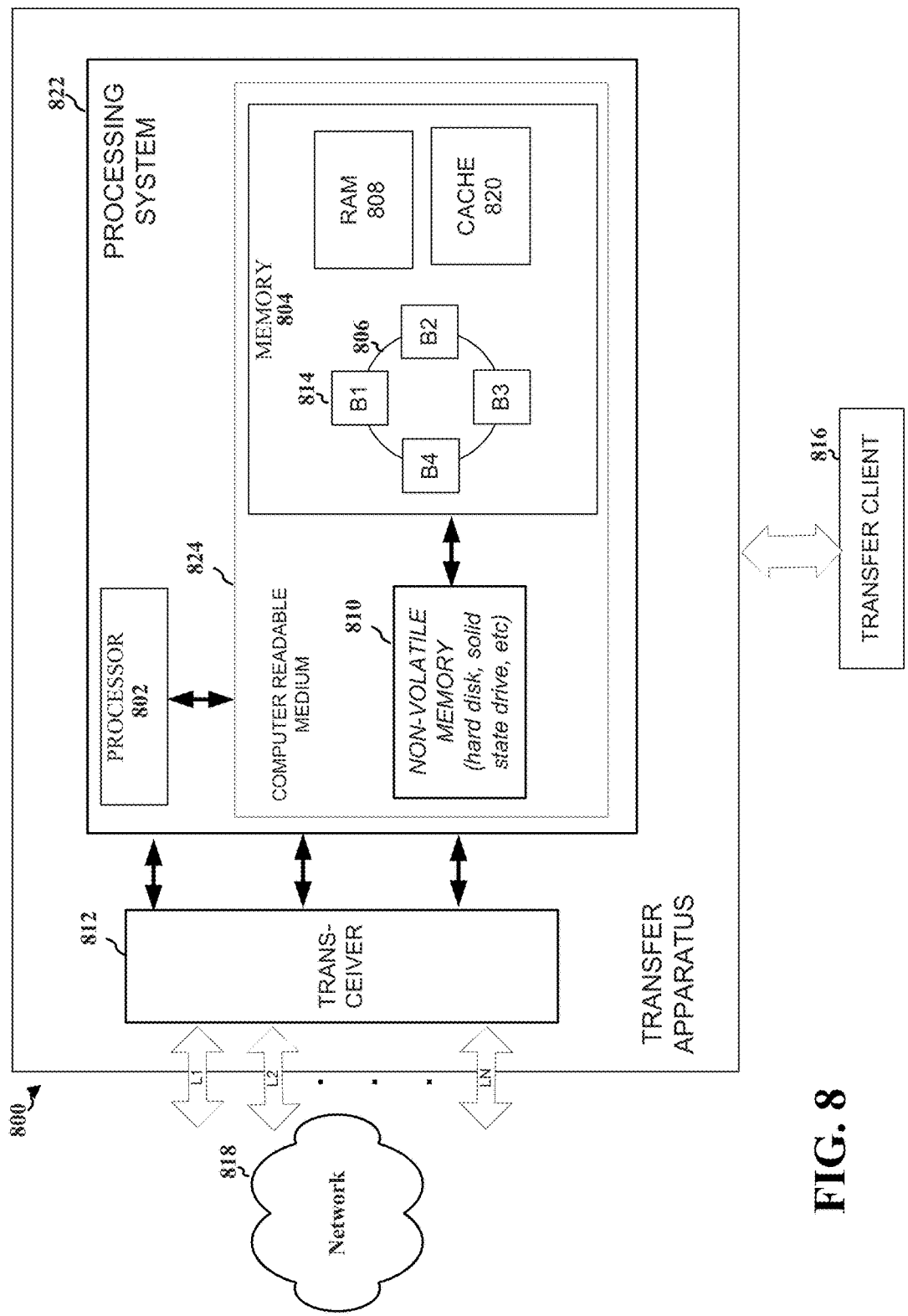
FIG. 8 is a diagram illustrating an apparatus for high speed data transfer.

FIG. 8 is a diagram illustrating an apparatus 800 for high speed data transfer. In some embodiments, apparatus 800 may reside on one or more machines. Apparatus 800 includes transceiver 812 and processing system 822. Processing system 822 includes processor 802 and computer readable medium 824. Computer readable medium 824 includes memory 804 and non-volatile memory 810. Non-volatile memory may include, for example, a hard disk or solid state drive or drive array, flash memory, etc. Memory 804 includes main memory (RAM 808), cache memory 820, and ring buffer 814. Ring buffer 806 is composed of buffers 814 B1-B4 for storing respective fragments and/or packets. Cache memory 820 may additionally or alternatively be internal to processor 802. Non-volatile memory 810 may include the application code corresponding to the worker threads, which may be placed into RAM 808 or cache memory 820 by processor 802. In some configurations, buffer 806 may be part of RAM 808. Memory 804 may be on the same machine or distributed over more than one machine. Apparatus 800 interfaces with network 818 via transceiver 812 and links L1-LN. The processor 802 may output the processed packets for transmission by the transceiver 812. Apparatus 800 may be connected to a transfer client 816 via a separate connection, such as a socket or pipe.

Processor 802 and processing system 822 provide a means for processing data, including retrieving and running code stored in computer readable medium 824 to perform functions such as scheduling a file transfer, processing packets, dividing a serial data stream into fragments, storing and retrieving fragments and packets, encoding fragments to produce segments, storing/writing segments into buffers, reading segments, packetizing segments, outputting packets for transmission, and determining an optimized encoding/packetizing scheme, a buffer size, a number of buffers to use, a TCP window size, a number of data streams, a buffer/packet scheduling scheme, an optimized queue, and the like. As discussed above, each of these tasks may be performed by different code pieces that correspond to different worker threads in the pool of worker threads. In some cases depending on the configuration, certain of these tasks may be implemented by a single thread, e.g., retrieving and fragmenting a serial data stream.

Figure 9:
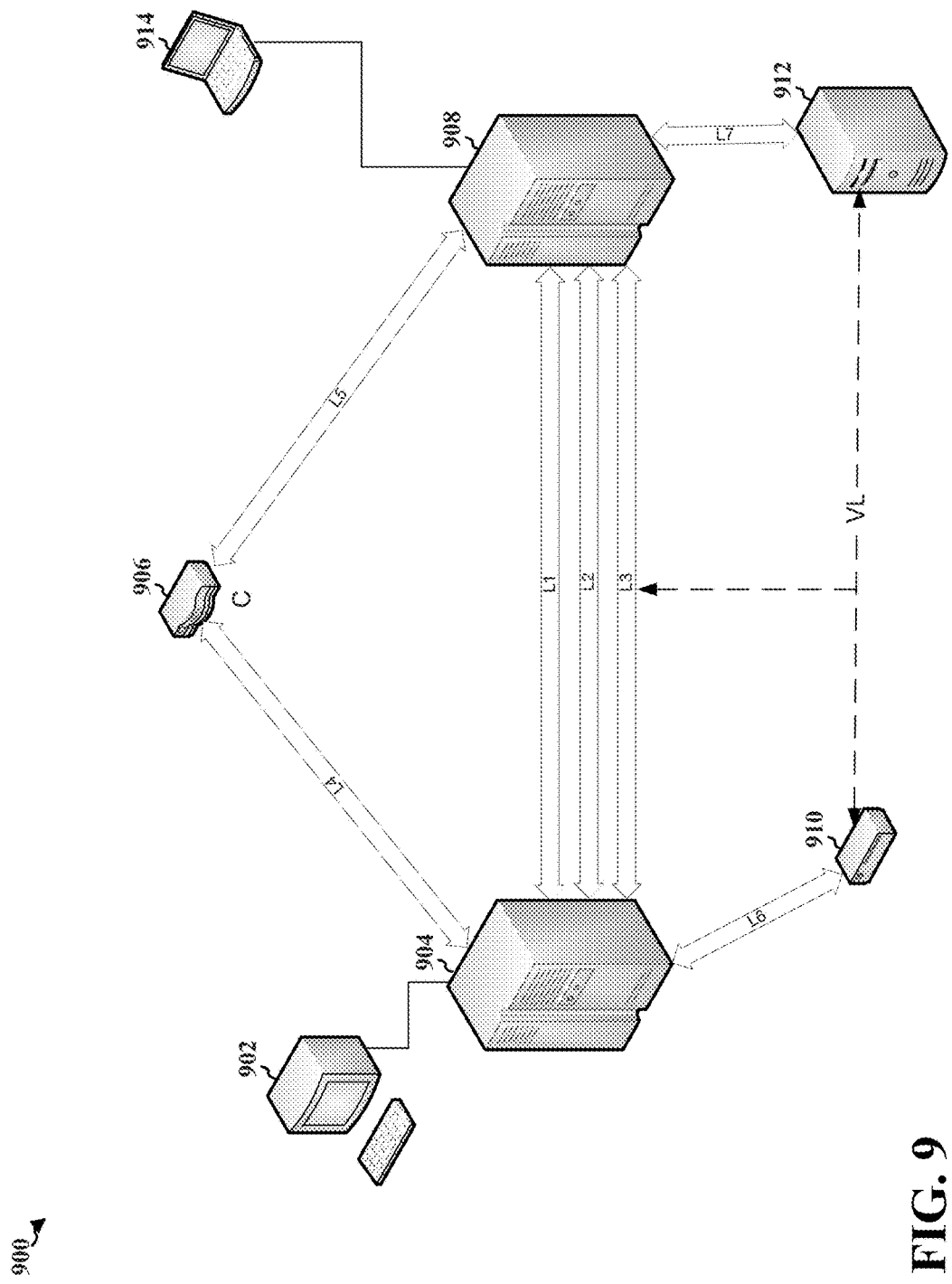
FIG. 9 is a diagram illustrating a configuration of nodes in a high speed data transfer network connected by links.

FIG. 9 is a diagram 900 illustrating a configuration of nodes in a high speed data transfer network connected by links. Generally, each transfer host can run simultaneous bi-directional links. Each link defines its destination(s) and services. PC 902 is used to provide graphical control over transfer server 904. Server 904 is coupled to server 908 via links 1, 2 and 3. Server 904 is connected to router 906 via link 4. Server 908 and router 906 are connected via link 5. Notebook computer 914 is connected to server 908 for providing manual control to the transfer application on server 908. Alternatively or additionally, PC 902 and notebook computer 914 may include transfer clients. Smart hub 910 is coupled to server 904 via link 6, and workstation 912 is coupled to server 908 via link 7. FIG. 9 also illustrates the use of virtual links. When services have no direct network connection to a desired destination service, data may be routed through existing links without sacrificing performance. In FIG. 9, a virtual link exists between smart hub 910 and workstation 912. While no direct links have been established between smart hub 910 and workstation 912, data may be transferred from smart hub 910 through server 904 (via link 6) and server 908 (via links 1-3 and 7) to workstation 912, and vice versa. Performance is limited only by the slowest link in the connection.

Figure 10:
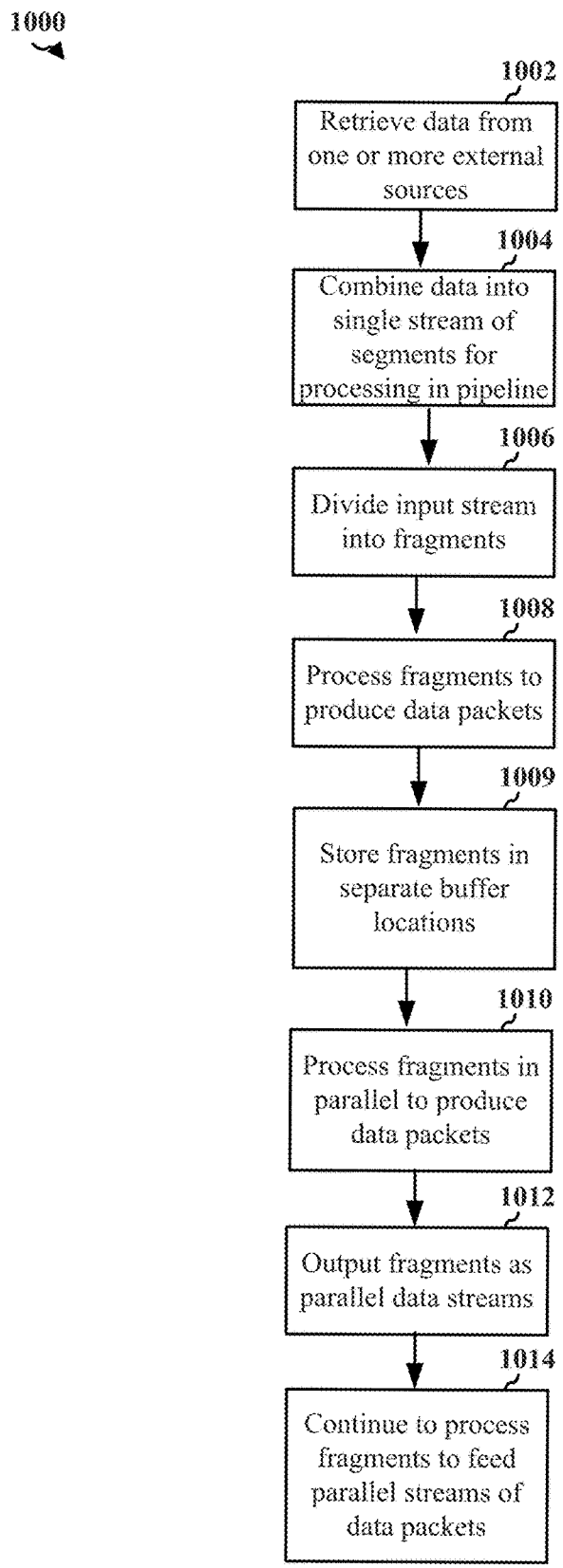
FIG. 10 is a flow diagram 1000 illustrating an example of a method for accelerating data transfer.

FIG. 10 is a flow diagram 1000 illustrating an example of a method for accelerating data transfer. At a source node, data is retrieved from one or more external sources (1002). The data is combined into a single stream of segments for processing in a file transfer pipeline (1004). The input stream is then divided into fragments (1006). Each of the fragments may then be provided to a separate buffer location, such as in a ring buffer, for further processing by worker threads (1009). The fragments in the buffer locations are processed in parallel to produce corresponding data packets (1010). The packets are then transmitted as parallel data streams over the network link (1012). For the individual buffer locations, once a packet is processed and retrieved for transmission over the associated network link, the next fragment is placed in the available buffer location, processed accordingly, and then included in one of the available output data streams and transmitted over the network in a manner that keeps the output data streams populated (1014).

To effect the bidirectional transfer of data over the same channels, the transfer engine may be duplexed. Referring back to FIG. 3, in a duplex system the serial-to-parallel configuration of host 302 (along with thread pool 306 which resides on host 302) is logically duplicated on host 316, and the parallel-to-serial configuration of host 316 is logically duplicated on host 302. In this way, accelerated file transfers can occur in both directions, using the same links and sockets.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for", or in the case of a method claim, the element is recited using the phrase "step for."

What is claimed is:

1. An apparatus for transferring data; comprising:
   a memory having code stored therein, the memory further comprising a buffer; and
   a processor coupled to the memory and configured to run the code as a plurality of threads of execution, wherein the processor is configured to:
   use the threads to read a plurality of data streams from at least one external source;
   combine the data streams into a single stream;
   divide the single stream into fragments;
   store the fragments in a location of the buffer;
   process each of the fragments in parallel to produce a corresponding data packet comprising ordering information;
   output the data packets as a plurality of parallel data streams for transmission by a transceiver over a network to a remote host; and
   store, after the corresponding data packet is output, a new one of the fragments in the buffer location for processing,
   wherein the storing and processing the fragments are configured to populate the plurality of the parallel data streams in an order that maximizes transmission throughput on a high latency network irrespective of data type.

2. The apparatus of claim 1, wherein the combining further comprises
   encoding each of the fragments to produce one or more segments, each of the segments corresponding to a data type, wherein the processor is further configured to process each of the stored fragments by
   packetizing each of the one or more segments to produce the corresponding data packet.

3. The apparatus of claim 2, wherein the processor is further configured to determine an encoding scheme for encoding the fragments.

4. The apparatus of claim 2, wherein the one or more segments comprise a command segment or a data segment.

5. The apparatus of claim 1, wherein the processor is further configured to process each of the stored fragments by:
   reading a first one of the fragments from a first buffer location in memory;
   reading a second one of the fragments from a second buffer location in memory;
   packetizing the first one of the fragments to produce a first one of the data packets; and
   packetizing the second one of the fragments to produce a second one of the data packets, wherein
   the processor is further configured such that at least one of the reading or packetizing the first one of the fragments is performed concurrently with and using a separate one of the threads from at least one of the reading or packetizing the second one of the fragments.

6. The apparatus of claim 1, wherein the buffer comprise a ring buffer.

7. The apparatus of claim 1, wherein the single stream comprises data of first and second types, the first type of data divided into a first set of fragments by the processor, the second type of data is divided into a second set of fragments by the processor, and the first type of data is divided into the first set of fragments by the processor at a data rate that is higher than a data rate at which the second type of data is being divided into the second set of fragments, wherein the processor is further configured to schedule the processing of the fragments such that the first set of fragments is allocated a greater number of buffer locations than the second set of fragments.

8. The apparatus of claim 1, wherein the processor is further configured to process each of the fragments by archiving the corresponding data packet.

9. The apparatus of claim 1, wherein the processor is further configured to output the parallel data streams for transmission over the network via a data link.

10. The apparatus of claim 9, wherein the processor is further configured to output the parallel data streams for transmission over the network via the data link to the remote host.

11. The apparatus of claim 1, wherein the processor is further configured to determine a Transmission Control Protocol (TCP) window for use by the transceiver in transmitting the data packets.

12. The apparatus of claim 1, wherein the processor is further configured to determine a packet size for use in outputting the data packets for transmission.

13. The apparatus of claim 1, wherein the processor is further configured to determine the number of the parallel data streams.

14. The apparatus of claim 1, wherein the processor is further configured to output additional data packets for transmission over the network subsequent to the data packets being transmitted and prior to receiving an acknowledgement (ACK) corresponding to at least one of the data packets.

15. The apparatus of claim 1, wherein the processor is further configured to determine a size of the buffer locations for use in storing the fragments.

16. The apparatus of claim 1, wherein the processor is further configured to determine a number of the buffer locations for use in storing the fragments.

17. The apparatus of claim 1, wherein the processor is further configured to determine a number of the threads for processing the fragments in parallel.

18. A method of transferring data; comprising:
reading a plurality of data streams from at least one external source;
combining the data streams into a single stream;
dividing the single stream into fragments;
storing each of the fragments in a location in a buffer;
processing each of the fragments in parallel to produce a corresponding data packet comprising ordering information;
transmitting the data packets as a plurality of parallel data streams over a network to a remote host; and
storing, after a data packet is produced, a new one of the fragments in the buffer location for processing,
wherein the storing and processing the fragments are configured to populate the plurality of the parallel data streams in an order that maximizes transmission throughput on a high latency network irrespective of data type.

19. The method of claim 18, wherein processing each of the fragments further comprises:
encoding each of the fragments to produce one or more segments, each of the segments corresponding to a data type; and
packetizing each of the one or more segments to produce the corresponding data packet.

20. The method of claim 19, further comprising determining an encoding scheme for encoding the fragments.

21. The method of claim 19, wherein the one or more segments comprise a command segment or a data segment.

22. The method of claim 18, wherein processing each of the stored fragments further comprises:
reading a first one of the fragments from a first buffer location;
reading a second one of the fragments from a second buffer location;
packetizing the first one of the fragments to produce a first one of the data packets; and
packetizing the second one of the fragments to produce a second one of the data packets, wherein at least one of the reading or packetizing the first one of the fragments is performed concurrently with and by a separate thread from at least one of the reading or packetizing the second one of the fragments.

23. The method of claim 18, wherein the buffer locations are part of a ring buffer.

24. The method of claim 18, further comprising scheduling the processing of the fragments such that a first set of fragments is allocated a greater number of buffer locations than a second set of fragments, wherein
the single stream comprises data of first and second types, the first type of data is divided into a first set of fragments, the second type of data is divided into a second set of fragments, and the first type of data is divided into the first set of fragments at a data rate that is higher than a data rate at which the second type of data is divided into the second set of fragments.

25. The method of claim 18, wherein processing each of the fragments further comprises archiving the corresponding data packet.

26. The method of claim 18, wherein each of the parallel data streams is transmitted over the network via a data link.

27. The method of claim 26, wherein packet ordering information is transmitted via the data link to the remote host.

28. The method of claim 18, further comprising determining a Transmission Control Protocol (TCP) window for use in transmitting the data packets.

29. The method of claim 18, further comprising determining a packet size for use in transmitting the data packets.

30. The method of claim 18, further comprising determining a number of the plurality of parallel data streams.

31. The method of claim 18, wherein additional data packets are transmitted over the network subsequent to transmitting the data packets and prior to receiving an acknowledgement (ACK) corresponding to at least one of the data packets.

32. The method of claim 18, further comprising determining a size of the buffer locations for use in storing the fragments.

33. The method of claim 18, further comprising determining a number of the buffer locations for use in storing the fragments.

34. The method of claim 18, further comprising determining a number of threads of execution for processing the fragments in parallel.

35. An apparatus for transferring data; comprising:
a processing system configured to:
run code stored in a memory of the processing system as a plurality of threads of execution, the memory having a buffer;
use the threads to read a plurality of data streams from at least one external source;
combine the data streams into a single stream;
divide the single stream into fragments;
store the fragments in a location in the buffer;
process each of the fragments in parallel to produce a corresponding data packet comprising ordering information;
output the data packets as a plurality of parallel data streams for transmission by a transceiver over a network to a remote host; and
store, after the corresponding data packet is output, a new one of the fragments in the buffer location for processing,
wherein the storing and processing the fragments are configured to populate the plurality of the parallel data streams in an order that maximizes transmission throughput on a high latency network irrespective of data type.

36. The apparatus of claim 35, wherein the processing system is further configured to:
encode each of the fragments to produce one or more segments, each of the segments corresponding to a data type; and
packetize each of the one or more segments to produce the corresponding data packet.

37. The apparatus of claim 36, wherein the one or more segments comprise a command segment or a data segment.

38. The apparatus of claim 35, wherein the buffer comprises a ring buffer.

39. The apparatus of claim 35, wherein the single stream comprises data of first and second types, the first type of data is divided into a first set of fragments by the processing system, the second type of data is divided into a second set of fragments by the processing system, and the first type of data is divided into the first set of fragments by the processing system at a data rate that is higher than a data rate at which the second type of data is being divided into the second set of fragments, and the processing system is configured to schedule the processing of the fragments such that the first set of fragments is allocated a greater number of buffer locations than the second set of fragments.

40. A computer program product comprising a non-transitory computer-readable medium having computer executable code for:
  reading a plurality of data streams from at least one external source;
  combining the data streams into a single stream;
  dividing the single stream into fragments;
  storing the fragments in a location in a buffer;
  processing each of the fragments in parallel to produce a corresponding data packet comprising ordering information;
  outputting the data packets as a plurality of parallel data streams for transmission over a network to a remote host; and
  storing, after the corresponding data packet is output, a new one of the fragments in the buffer location for processing,
  wherein the storing and processing the fragments are configured to populate the plurality of the parallel data streams in an order that maximizes transmission throughput on a high latency network irrespective of data type.

41. The computer program product of claim 40, wherein the code for processing each of the stored fragments further comprises code for:
  encoding each of the fragments to produce one or more segments, each of the segments corresponding to a data type; and
  packetizing each of the one or more segments to produce the corresponding data packet.

42. The computer program product of claim 41, wherein the one or more segments comprise a command segment or a data segment.

43. The computer program product of claim 41, further comprising code for determining an encoding scheme for encoding the fragments.

44. The computer program product of claim 40, wherein processing each of the fragments further comprises:
  reading a first one of the fragments from a first buffer location;
  reading a second one of the fragments from a second buffer location;
  packetizing the first one of the fragments to produce a first one of the data packets; and
  packetizing the second one of the fragments to produce a second one of the data packet, wherein at least one of the reading or packetizing the first one of the fragments is performed concurrently with and by a separate thread from at least one of the reading or packetizing the second one of the fragments.

45. The computer program product of claim 40, wherein the buffer locations are part of a ring buffer.

46. The computer program product of claim 40, wherein the code for processing each of the fragments further comprises code for scheduling the processing of the fragments such that a first set of fragments is allocated a greater number of buffer locations than a second set of fragments, wherein
  the single stream comprises data of first and second types, the first type of data is divided into a first set of fragments, the second type of data is divided into a second set of fragments, and the first type of data is divided into the first set of fragments at a data rate that is higher than a data rate at which the second type of data is divided into the second set of fragments.

47. The computer program product of claim 40, wherein the code for processing each of the fragments further comprises archiving the corresponding data packet.

48. The computer program product of claim 40, further comprising code for outputting each of the parallel data streams for transmission over the network via a data link.

49. The computer program product of claim 48, further comprising code for outputting packet ordering information for transmission via the data link to the remote host.

50. The computer program product of claim 40, further comprising code for determining a Transmission Control Protocol (TCP) window for use in transmitting the data packets.

51. The computer program product of claim 40, further comprising code for determining a packet size for use in transmitting the data packets.

52. The computer program product of claim 40, further comprising code for determining a number of the plurality of parallel data streams.

53. The computer program product of claim 40, further comprising code for outputting additional data packets for transmission over the network subsequent to the data packets being transmitted and prior to receiving an acknowledgement (ACK) corresponding to at least one of the data packets.

54. The computer program product of claim 40, further comprising code for determining a size of buffer locations for use in storing the fragments.

55. The computer program product of claim 40, further comprising code for determining a number of buffer locations for use in storing the fragments.

56. The computer program product of claim 40, further comprising code for determining a number of threads of execution for processing the fragments in parallel.

* * * * *

EX PARTE REEXAMINATION CERTIFICATE (11742nd)

United States Patent
Szilagyi

(10) Number: US 10,069,766 C1
(45) Certificate Issued: Oct. 26, 2020

(54) ACCELERATED DATA TRANSFER USING THREAD POOL FOR PARALLEL OPERATIONS

(71) Applicant: TransferSoft, Inc., Culver City, CA (US)

(72) Inventor: Attila Mark Szilagyi, San Pedro, CA (US)

(73) Assignee: TRANSFERSOFT, INC., Culver City, CA (US)

Reexamination Request:
No. 90/014,280, Mar. 28, 2019

Reexamination Certificate for:
Patent No.: 10,069,766
Issued: Sep. 4, 2018
Appl. No.: 14/793,608
Filed: Jul. 7, 2015

(51) Int. Cl.
*H04L 12/861* (2013.01)
*H04B 1/04* (2006.01)
*H04L 12/801* (2013.01)
*H04L 12/805* (2013.01)

(52) U.S. Cl.
CPC ....... *H04L 49/9005* (2013.01); *H04B 1/0483* (2013.01); *H04L 47/193* (2013.01); *H04L 47/365* (2013.01); *H04L 49/9057* (2013.01)

(58) Field of Classification Search
None
See application file for complete search history.

(56) References Cited

To view the complete listing of prior art documents cited during the proceeding for Reexamination Control Number 90/014,280, please refer to the USPTO's public Patent Application Information Retrieval (PAIR) system under the Display References tab.

*Primary Examiner* — David E England

(57) ABSTRACT

A method, an apparatus, and a computer program product for accelerating network data transfer are provided. In one aspect, a plurality of data streams are received at a local host, combined into a single stream and divided into fragments including one or more segments. The fragments are each stored in buffers and processed in parallel by a plurality of worker threads. Each fragment is encoded and packetized into a data packet. The data packets are transmitted over a network to a remote host as a plurality of parallel data streams over at least one data link. As buffer locations become available, additional fragments are stored in the buffer and processed on a substantially ongoing basis for transmission over the network.

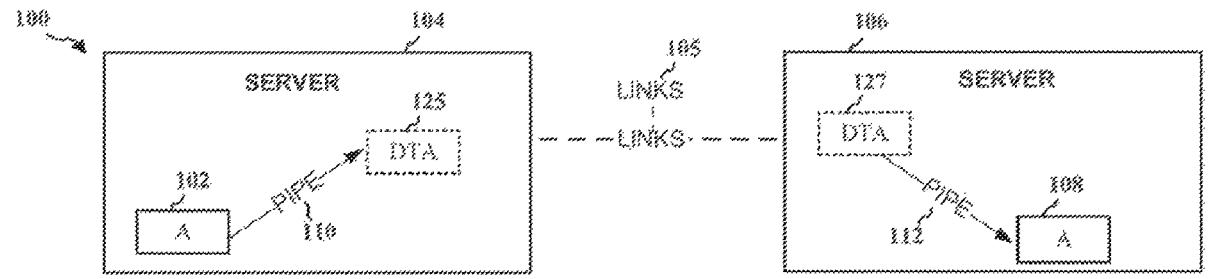

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-56 are cancelled.

\* \* \* \* \*